Patented Aug. 2, 1932

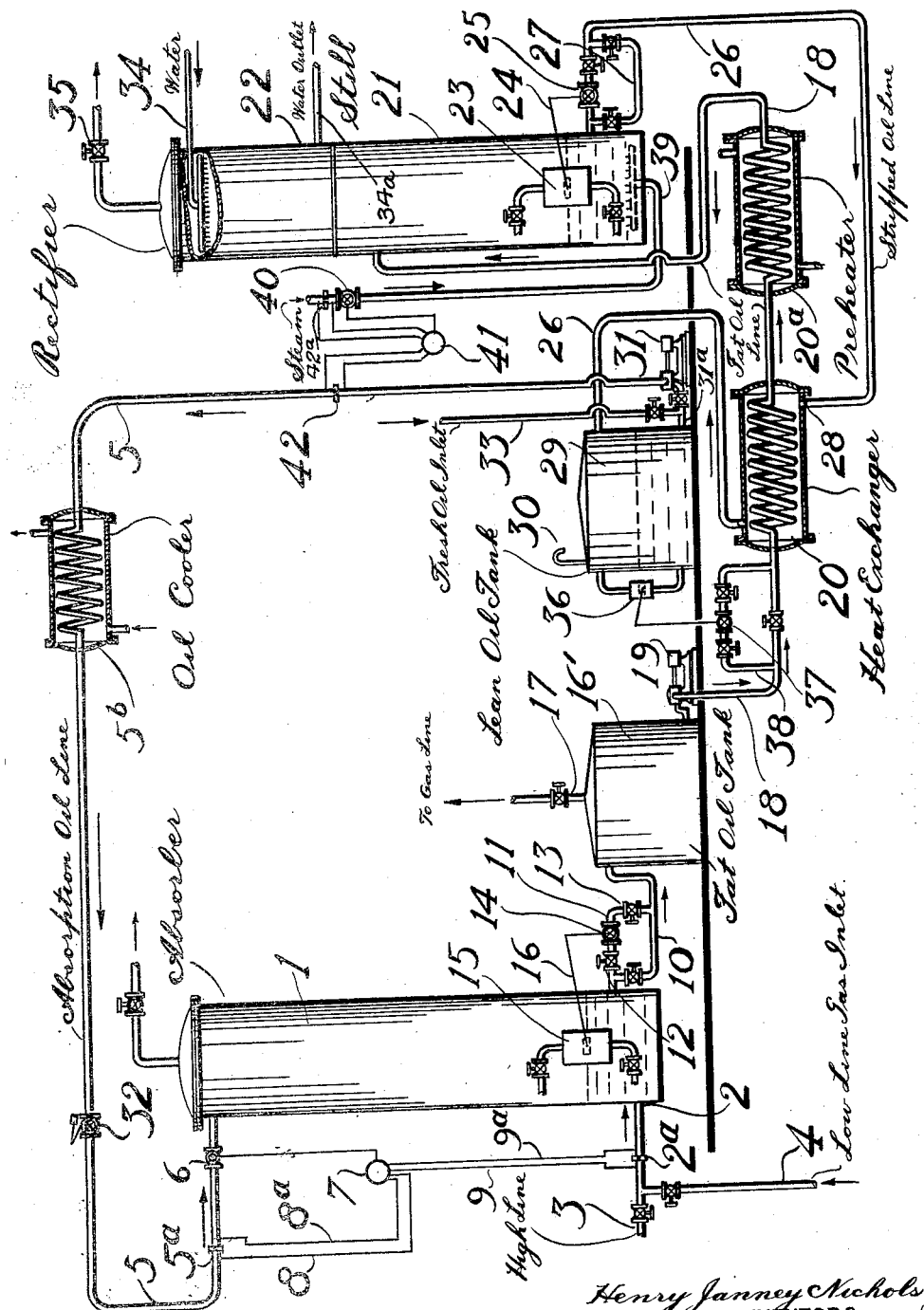

1,869,611

UNITED STATES PATENT OFFICE

HENRY JANNEY NICHOLS, JR., AND PAUL E. KUHL, OF ROSELLE, NEW JERSEY, ASSIGNORS TO STANDARD OIL DEVELOPMENT COMPANY, A CORPORATION OF DELAWARE

APPARATUS FOR ABSORBING GAS

Application filed May 2, 1929. Serial No. 359,786.

This invention relates to improvements in gas absorption equipment and particularly to means for automatically operating such equipment. Principal objects of the invention are to provide for the adjustment of the quantity of absorption oil in accordance with variations in gas flow, and for the control of the inflow and outflow of oil, and the inflow of steam, to the stripping still.

The invention will be fully understood from the following description read in connection with the accompanying drawing, in which the figure is a diagrammatic side elevation of preferred equipment.

In the drawing, 1 denotes an absorber of usual type receiving gas from a line 2. This line may be supplied with gas from a "high line" 3 connected to cracking stills or other sources of gas under high pressure. A "low line" 4 may also supply gas to the line 2. It will be understood that the gas in the low line has been passed through compressors and so raised to the required pressure with the removal of condensible constituents.

Absorption oil is supplied to the upper part of absorber 1 through a line 5. A valve 6 in this line is connected to a ratio control instrument 7 which may be of any approved type. Orifice plates 2a and 5a are installed respectively in lines 2 and 5. These lines are connected through leads 8, 8a and 9, 9a with manometers on the ratio control instrument. By a suitable actuating mechanism, well known in instruments of this type, the differential pressure across the orifice plates controls the flow of air which in turn actuates the valve 6. In this way the variations in gas flow are caused to control the inflow of absorption oil to the absorber. The connections are such that an increase in gas flow causes a corresponding influx of oil and vice versa.

The charged absorption oil (fat oil) is run out of absorber 1 through a line 10. This has a by-pass 11 controlled by valves 12, 13 and 14. A float control device indicated generally by 15 is installed in the lower part of absorber 1. This device is connected by suitable mechanical means 16 to valve 14. Float control of the level of liquid in the absorber is well understood in the art and forms no part of the present invention.

The fat oil is discharged into a tank 16' which has an outlet 17 leading to a gas line. From this tank the oil is passed through line 18 by pump 19 through a heat exchanger 20, preheater 20a, and into the upper part of a column still 21. This still has the usual rectifying section 22 superposed on the still proper.

A float control device 23 in the lower part of the still has a connection 24 with a valve 25 in the outlet line 26. This line also has a by-pass 27. The stripped oil flows from the still through line 26 and passes at 28 in heat exchange with the fat oil flowing to the still. The stripped or lean oil from the still flows into a tank 29, which has a vent 30. Lean oil is pumped through line 5 by a pump 31 through cooler 5b to the absorber 1. A pressure control valve 32 may be installed in line 5. Fresh oil is supplied when required through a line 33 communicating with line 31a. Water is introduced into the top of the rectifying section 22 through a line 34 and withdrawn through line 34a. Gasoline vapors are taken off from this section through a line 35 to condensers, coolers and storage tanks.

It will be understood that additional heat exchange equipment and other adjuncts may be supplied.

A float control device 36 is connected to the lean oil tank 29 and controls a valve 37 in a by-pass 38 which communicates with line 18. In this way the level of oil in the lean oil tank controls the flow of fat oil to the still. Accordingly, there is always a correspondence between the amount of oil leaving and entering the still notwithstanding variations in the oil inflow to the absorber.

Spray steam is introduced into the bottom of the still through a line 39. The flow of steam is controlled by a valve 40 which is connected through a ratio control instrument 41 to orifice plate 42 in line 5 and to orifice plate 42a in line 39. The amount of oil flowing through line 5 accordingly controls the steam inlet to the still in a similar manner to the control of oil into the absorber, as before described. This control might be put on the fat oil line entering the still, but it is preferable to place it as shown since the evolution of gas from the fat oil may interfere with the regulation.

It is highly essential that a definite ratio of oil to gas be maintained in the absorbers for any given pressure, temperature, and type of absorber. As the flow of gas varies frequently and through rather wide limits, as the rate at which oil is introduced to the absorbers must be regulated every time the gas flow changes, and as the liquid level controls will release oil from the absorbers at the same rate at which it is introduced, constant care is required of the operators to regulate the speed of the pumps. We have found that by arranging a valve control on the fat oil line actuated by the liquid level in the lean oil tank we can automatically effect this regulation. If a centrifugal pump is used the valve may be operated directly by the control device through a suitable motor, or if a steam driven pump is used the control may be effected by causing the float to regulate the amount of steam supplied to the pump.

It will be understood that the system illustrated is operated in the customary manner except for the regulation specified. Gas oil or the like is used as the absorption medium. Steam directly discharged into the bottom of the still is preferred but other equivalent distilling means may be used.

The foregoing description is merely illustrative and various changes and alternative arrangements may be made within the scope of the appended claims, in which it is our intention to claim all novelty inherent in the invention as broadly as the prior art permits.

We claim:

1. In an absorption system, an absorber, lines for separately supplying oil and gas thereto, a tank connected to the absorber to receive the charged oil, means for expelling absorbed constitutents from the charged oil, a charged oil line connecting said tank with the means for expelling absorbed constituents, means for drawing off the oil freed from absorbed constituents, a tank receiving the oil so freed from the absorbed constituents, a float control device actuated by the level of liquid in the last mentioned tank, and means for causing the float control device to actuate a valve in the charged oil line.

2. In an absorption system, an absorber, means for separately introducing oil and gas thereto, means for controlling the inflow of absorption oil in accordance with the quantity of gas entering the absorber, means for expelling absorbed constituents from charged oil, means for collecting the oil from which the absorbed constituents have been expelled and means controlled by the last mentioned oil and adapted to regulate the flow of charged oil.

3. In an absorption system, an absorber, means for supplying oil and gas thereto, a still, a stripped oil tank connected with the still, means for passing charged oil to the still, a steam line for introducing steam into the lower part of the still, a line for withdrawing stripped oil from the stripped oil tank, and means in said last mentioned line controlling the flow of steam in the steam line.

HENRY JANNEY NICHOLS, Jr.
PAUL E. KUHL.